US012311993B2

(12) United States Patent
Dziak et al.

(10) Patent No.: US 12,311,993 B2
(45) Date of Patent: May 27, 2025

(54) CONVERTIBLE STROLLERS

(71) Applicant: Baby Jogger, LLC, Atlanta, GA (US)

(72) Inventors: Daniel Emil Dziak, Alpharetta, GA (US); Megan Cahill Roe, Roswell, GA (US); Minsung Danny Jeong, Atlanta, GA (US); Darren Zhen Kit Tan, Marietta, GA (US)

(73) Assignee: Baby Jogger, LLC, Atlanta, GA (US)

( * ) Notice: Subject to any disclaimer, the term of this patent is extended or adjusted under 35 U.S.C. 154(b) by 177 days.

(21) Appl. No.: 18/191,426

(22) Filed: Mar. 28, 2023

(65) Prior Publication Data

US 2023/0331276 A1    Oct. 19, 2023

Related U.S. Application Data

(60) Provisional application No. 63/363,167, filed on Apr. 18, 2022.

(51) Int. Cl.
*B62B 7/04* (2006.01)
*B62B 7/00* (2006.01)
(Continued)

(52) U.S. Cl.
CPC .......... *B62B 7/008* (2013.01); *B62B 7/044* (2013.01); *B62B 9/12* (2013.01); *B62B 2206/02* (2013.01)

(58) Field of Classification Search
CPC .......... B62B 7/008; B62B 7/044; B62B 7/08; B62B 7/14; B62B 7/142; B62B 7/145; B62B 7/147; B62B 9/12; B62B 2206/02
See application file for complete search history.

(56) References Cited

U.S. PATENT DOCUMENTS

| 1,707,186 A | * | 3/1929 | Chatfield | ................ B62B 9/102 |
| | | | | 280/47.35 |
| 6,550,802 B2 | * | 4/2003 | Sheehan | ................... B62B 7/12 |
| | | | | 280/658 |

(Continued)

FOREIGN PATENT DOCUMENTS

GB    2193692 A  *  2/1988  ............ B62B 7/008

OTHER PUBLICATIONS

Bugaboo Donkey 5 Duo, https://www.bugaboo.com/us-en/strollers/bugaboo-donkey-5-duo/bugaboo-donkey-5-duo-bassinet-and-seat-stroller-PM004727.html, accessed Mar. 28, 2023. 1 page.

(Continued)

*Primary Examiner* — John D Walters
(74) *Attorney, Agent, or Firm* — Eversheds Sutherland (US) LLP

(57) ABSTRACT

A convertible stroller assembly may be convertible between a single-occupant configuration and a dual-occupant configuration. The convertible stroller assembly includes a stroller frame being convertible between a laterally contracted configuration and a laterally expanded configuration. The assembly further includes a plurality of rear wheels coupled to the stroller frame. The assembly further includes a front wheel coupled to the stroller frame. The convertible stroller assembly is convertible between (i) a single-occupant configuration in which the stroller frame is in the laterally contracted configuration with the rear wheels being separated by a first spacing, and (ii) a dual-occupant configuration in which the stroller frame is in the laterally expanded configuration with the rear wheels being separated by a second spacing greater than the first spacing.

19 Claims, 5 Drawing Sheets

(51) Int. Cl.
    *B62B 7/08*        (2006.01)
    *B62B 7/14*        (2006.01)
    *B62B 9/12*        (2006.01)

(56) References Cited

U.S. PATENT DOCUMENTS

| | | | |
|---|---|---|---|
| 6,752,405 B1 * | 6/2004 | Wright | B62B 7/06 |
| | | | 280/47.38 |
| 8,444,171 B2 | 5/2013 | Smith et al. | |
| 8,899,615 B2 * | 12/2014 | Dijkstra | B62B 9/087 |
| | | | 280/42 |
| 9,561,817 B2 | 2/2017 | Laffan et al. | |
| D811,949 S | 3/2018 | Stiba et al. | |
| D834,457 S | 11/2018 | Laffan et al. | |
| 2016/0229441 A1 | 8/2016 | Laffan et al. | |

OTHER PUBLICATIONS

The Entourage—Double Bundle, https://austlen.com/collections/sit-stand?variant=39690228760642, accessed Mar. 28, 2023, 1 page.

* cited by examiner

CONVERTIBLE STROLLERS

CROSS-REFERENCE TO RELATED APPLICATION

This application claims the benefit of U.S. Provisional Application No. 63/363,167, filed Apr. 18, 2022, the entirety of which is hereby incorporated by reference.

TECHNICAL FIELD

The present disclosure relates generally to strollers, and in particular, to convertible strollers.

BACKGROUND

Strollers may be used to seat children for travel or leisure. Some strollers can seat a single occupant, while other strollers can seat two occupants. However, multi-occupant strollers are typically bulky, and may be difficult to use and maneuver. For example, a side-by-side dual-occupant stroller may have a relatively greater width, and a front-to-back dual-occupant stroller may be elongated, relative to a conventional single-occupant stroller. Even if a single occupant occupies a multi-occupant stroller, the multi-occupant stroller may remain the same size as for two occupants.

A need remains for strollers that are convertible for various uses.

SUMMARY

The present disclosure describes strollers, and in particular, convertible strollers.

In embodiments, the present disclosure describes a convertible stroller assembly convertible between a single-occupant configuration and a dual-occupant configuration. The convertible stroller assembly includes a stroller frame being convertible between a laterally contracted configuration and a laterally expanded configuration. The assembly further includes a plurality of rear wheels coupled to the stroller frame. The assembly further includes a front wheel coupled to the stroller frame. The convertible stroller assembly is convertible between (i) a single-occupant configuration in which the stroller frame is in the laterally contracted configuration with the rear wheels being separated by a first spacing, and (ii) a dual-occupant configuration in which the stroller frame is in the laterally expanded configuration with the rear wheels being separated by a second spacing greater than the first spacing.

Figure 2A:
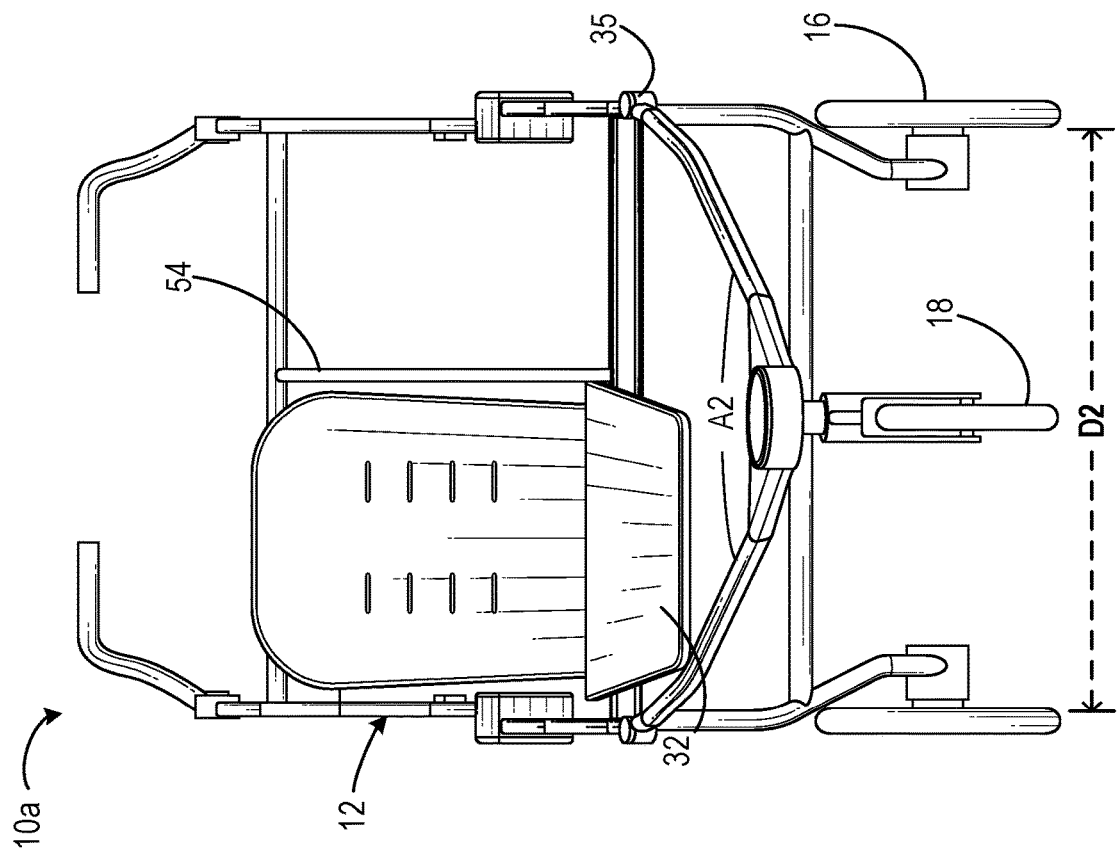
FIG. 2A is a conceptual front view of the stroller assembly of FIG. 1 converted to a dual-occupant configuration.

The detailed description is set forth with reference to the accompanying drawings. The drawings are provided for purposes of illustration only and merely depict example embodiments of the disclosure. The drawings are provided to facilitate understanding of the disclosure and shall not be deemed to limit the breadth, scope, or applicability of the disclosure. The use of the same reference numerals indicates similar, but not necessarily the same or identical components. Different reference numerals may be used to identify similar components. Various embodiments may utilize elements or components other than those illustrated in the drawings, and some elements and/or components may not be present in various embodiments. The use of singular terminology to describe a component or element may, depending on the context, encompass a plural number of such components or elements and vice versa.

DETAILED DESCRIPTION

The present disclosure describes stroller assemblies that are convertible for different uses. For example, a stroller assembly may be convertible between a single-occupant configuration and a dual-occupant configuration.

Conventional double strollers may require placing one occupant in front of the other, creating an in-line sitting position. However, this may cause the stroller frame to become very long, and would compromise maneuverability. Another configuration is a side-by-side seating, which results in a wider frame. Conventional expandable strollers have two spaced-apart front wheels in addition to rear wheels, which allows for a shorter overall wheelbase when in double mode, but the use of four wheels (two spaced-apart front wheels in particular) may compromise maneuverability.

Stroller assemblies according to the present disclosure advantageously combines the maneuverability of a 3-wheel stroller with a side-to-side expandability, and an ability to fold the stroller in either a single-occupant or dual-occupant configuration.

In embodiments, the present disclosure describes a convertible stroller assembly convertible between a single-occupant configuration and a dual-occupant configuration. The convertible stroller assembly includes a stroller frame being convertible between a laterally contracted configuration and a laterally expanded configuration. The assembly further includes a plurality of rear wheels coupled to the stroller frame. The assembly further includes a single front wheel coupled to the stroller frame. The convertible stroller assembly is convertible between (i) a single-occupant configuration in which the stroller frame is in the laterally contracted configuration with the rear wheels being separated by a first spacing, and (ii) a dual-occupant configuration in which the stroller frame is in the laterally expanded configuration with the rear wheels being separated by a second spacing greater than the first spacing.

In the single-occupant mode, stroller assemblies according to the present disclosure may resemble a three-wheel stroller, for example, with a full seat including recline. In embodiments, a stroller assembly according to the present disclosure may include a trigger-style fold latch near a handle that allows the user to actuate the fold without bending over.

When ready to convert the stroller to a dual-occupant configuration (or simply to expand the stroller for storing or transporting additional items such as bags or bins), the stroller assembly expands sideways. A bench seat or another seat may be secured in the expanded dual-occupant configuration. Thus, an older occupant may choose to ride the stroller or walk, and climb onto the seat from both the front or back of the stroller. The stroller assembly can be folded in double mode, or can be contracted back into single-occupant mode for a more compact and easier to manage folding.

Figure 1:
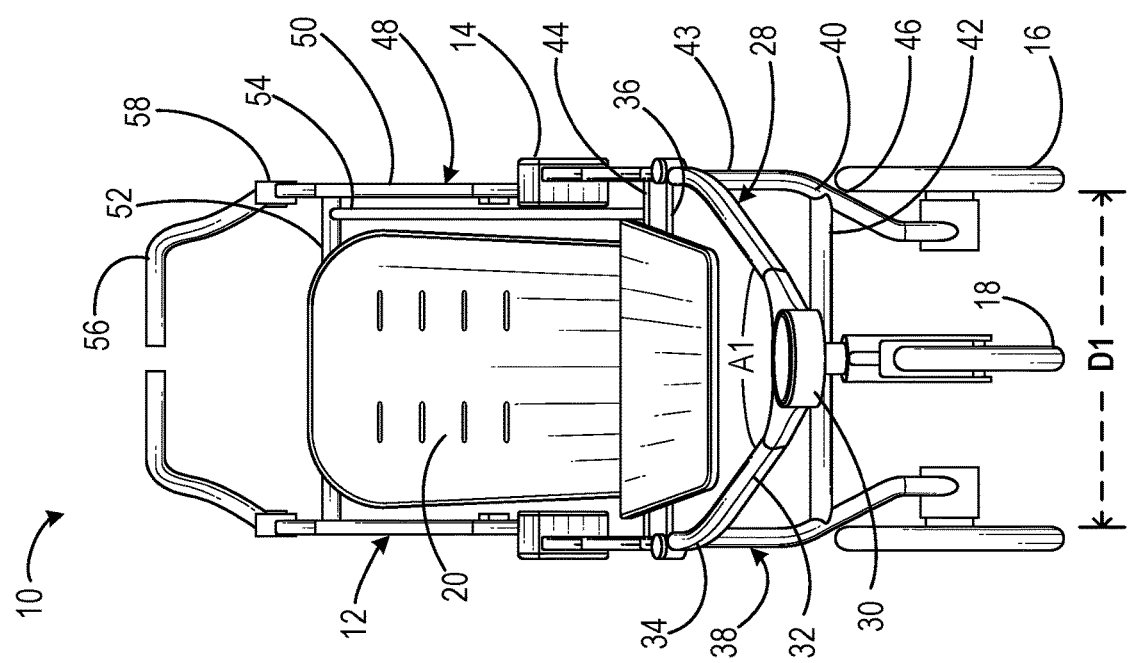
FIG. 1 is a conceptual front view of a convertible stroller assembly in a single-occupant configuration.

FIG. 1 is a conceptual front view of a convertible stroller assembly 10 in a single-occupant configuration. The assembly 10 includes a stroller frame 12 being convertible between a laterally contracted configuration (shown in FIG. 1) and a laterally expanded configuration (shown in FIGS. 2A and 2B). The stroller frame 12 may be formed of one or materials, for example, a metal, an alloy, a plastic, a carbon-fiber, a composite material, or combinations thereof.

The assembly 10 may include a pair of laterally opposed hubs 14. The hubs 14 may be formed of one or more materials, for example, a metal, an alloy, a plastic, a carbon-fiber, a composite material, or combinations thereof. In some embodiments, the stroller frame 12 is formed of an alloy, and the hubs 14 are formed from plastic.

The hubs 14 may be formed as left-right mirrored pairs, for example, with corresponding openings, edges, surfaces, or contours. In embodiments, the hubs 14 are formed as substantially cylindrical shells, with one end of the respective cylinder being closed, and another end being open. For example, the closed ends of the hubs 14 may face outward, while the open ends may face inward, for example, to receive one or more components of the assembly 10.

In some embodiments, one or more portions or ends of the stroller frame 12 are received by corresponding windows, openings, slots, or tabs, defined in hubs 14. In some embodiments, the hubs 14 may be rigid, but have some give or flexibility, to allow limited or defined relative movement between components of the assembly 10, for example, to permit folding and unfolding of the assembly 10.

The assembly further includes a plurality of rear wheels 16 coupled to the stroller frame 12. The rear wheels 16 may be coupled along a single axle coupled to the stroller frame 12, or may be individually coupled to the stroller frame 12.

The assembly further includes a front wheel 18 coupled to the stroller frame 12. The front wheel 18 may be coupled to the frame 12 by a leg or a fork, or any suitable mechanism. Wheels 16 or 18 may be formed of any suitable material or combinations of materials. In some embodiments, the front wheel 18 is laterally centered relative to two outer rear wheels 16, for example, like a tricycle. In some embodiments, the front wheel 18 is laterally centered with respect to the stroller frame 12 in the single-occupant configuration 10 and the dual-occupant configuration 10a.

While two wheels 16 are shown in FIG. 1, more than two rear wheels 16 may be present. In some embodiments, no more than one front wheel 18 is present in assembly 10, and the front wheel is a single front wheel 18. While a single front wheel 18 is shown in FIG. 1, more than one front wheel may be present. For example, the assembly 10 may include two or more front wheels. The front wheels may be laterally spaced apart. In some embodiments, the assembly 10 may include twin front wheels laterally adjacent each other, and which may effectively function as a single unit or a cooperating unit. Thus the term "single" front wheel may refer to multiple front wheels or twin or tandem front wheels, for example, front wheels that are not substantially spaced apart, and which pivot and turn together substantially as a single unit as the stroller is moved.

Figure 2B:
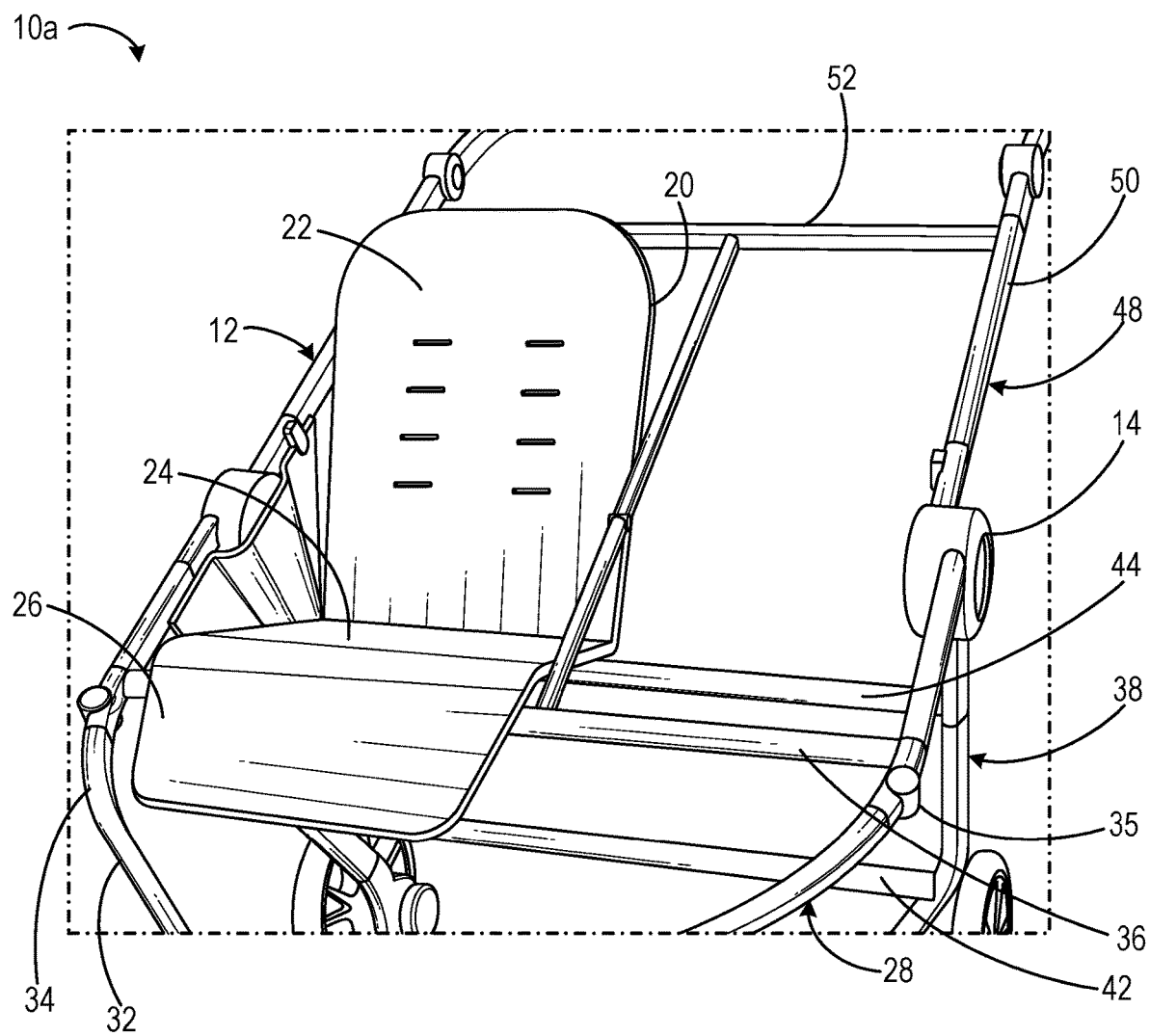
FIG. 2B is a conceptual partial perspective view of the stroller assembly of FIG. 2A.

FIG. 2A is a conceptual front view of the stroller assembly 10 of FIG. 1 converted to a dual-occupant configuration 10a. FIG. 2B is a conceptual partial perspective view of the stroller assembly 10a of FIG. 2A.

The convertible stroller assembly 10 is convertible between (i) a single-occupant configuration (shown in FIG. 1) and (ii) a dual-occupant configuration (shown in FIGS. 2A and 2B). In the dual-occupant configuration 10a, an additional seat frame may be coupled to the stroller frame 12, for example, by the user.

In the single-occupant configuration of the assembly 10, the stroller frame 12 is in the laterally contracted configuration with the rear wheels 16 being separated by a first spacing D1. In the dual-occupant configuration of the assembly 10a, the stroller frame 12 is in the laterally expanded configuration with the rear wheels 16 being separated by a second spacing D2 greater than the first spacing D1. For example, D2:D1 may be in a ratio of 1.1:1 or more, 1.2:1 or more, 1.3:1 or more, 1.4:1 or more, 1.5:1 or more, or 2:1 or more. In some embodiments, the assembly may be used in an intermediate configuration, with a spacing between the rear wheels being greater than D1 and less than D2. For example, the stroller frame 12 may be partially expanded and held in the intermediate configuration.

To facilitate a description of the convertibility of the assembly 10, only substantially structural components are shown in FIGS. 1, 2A, and 2B. The stroller assembly may further include one or more finishing elements or materials. For example, the finishing elements or materials may include liners, foams, netting, webs, fabrics, padding, or other finishing elements.

In embodiments, each hub of the pair of laterally opposed hubs 14 is between the front wheel 18 and the rear wheels 16 in a direction from the at least front wheel 18 to the rear wheels 16. In some embodiments, each hub of the pair of laterally opposed hubs 14 is offset from a geometric center between the front wheel 18 and the rear wheels 16 in a direction toward the rear wheels 16. For example, the hubs 14 may be closer to the rear wheels 16 than to the front wheel 18.

In embodiments, the assembly 10 further includes a seat frame 20 coupled to the stroller frame 12. In some embodiments, the seat frame 20 is fixedly coupled to the stroller frame 12 such that a position of the seat frame 20 relative to one side of the stroller frame 12 remains the same in the single-occupant configuration 10 and the dual-occupant configuration 10a. The spacing of the seat frame 20 relative to the other side of the stroller frame 12 would expand and contract as appropriate during conversion of the stroller.

In some embodiments, the assembly 10 further includes an additional seat frame, which may be substantially the same as seat frame 20, or may be different in size, shape, or orientation than the seat frame 20. For example, the additional seat frame may be smaller in size, and intended to seat a larger occupant than the seat frame 20. In some embodiments, the additional seat frame may only include a bench or a seat base. In some embodiments, no additional seat frame may be used, and the additional space provided adjacent the seat frame 20 in the dual-occupant configuration may be used to store or transport supplies, for example, bags, bins, pet carriers, or other materials. In some embodiments, the seat frame 20 may be expandable, such that the seat frame 20 seats one occupant in the single-occupant configuration and expands to a width that seats two occupants in the dual-occupant configuration. For example, the seat frame 20 may contract or fold into the single-occupant configuration, and expand, stretch, or unfold into the dual-occupant configuration. While a dual-occupant configuration is described, it is understood that multiple occupants may occupy the seat, for example, in a similar triple-occupant configuration, or the like.

The seat frame 20 may include a seat back 22 extending from a seat base 24. The seat frame 20 may further include a leg support 26 extending forward from the seat base. The leg support may be inclined relative to the seat base. In some embodiments, the seat frame 20 is integrally formed, for example, with one or more of the seat back 22, the seat base 24, and the leg support 26 being formed of a continuous material or as a single unit. In some embodiments, one or more of the seat back 22, the seat base 24, and the leg support 26 are adjustable, for example, in inclination or orientation. In other embodiments, one or more of the seat back 22, the seat base 24, and the leg support 26 have a fixed position or orientation. The seat frame 20 may be formed of any suitable material, similar to that described with reference to the stroller frame 12. The seat frame 20 may be finished with a finishing material described elsewhere herein.

In embodiments, the stroller frame 12 includes a laterally expandable front frame assembly 28. The front wheel 18 may be coupled to the front frame assembly 28. The front frame assembly 28 may be coupled to the pair of laterally opposed hubs 14.

In some embodiments, the front frame assembly 28 includes a front hub assembly 30. The front wheel may be coupled to the front hub assembly 30. The front hub assembly 30 may be formed of a material similar to that described with reference to hubs 14. The front hub assembly 30 may accommodate a lateral expansion of the front frame assembly 28 while also allowing the front wheel 18 to rotate and movement to permit free movement of the stroller assembly 10.

In embodiments, the front frame assembly 28 includes a pair of opposed front bars 32 rotatably coupled to the front hub assembly 30. The pair of front bars 32 define a first inter-bar angle A1 at the front hub in the single-occupant configuration 10 and a second inter-bar angle A2 greater than the first inter-bar angle in the dual-occupant configuration 10*a*. In some embodiments, each front bar of the pair of opposed front bars 32 is coupled to a respective hub of the pair of laterally opposed hubs 14. For example, a front end of a front bar 32 may be coupled to the front hub assembly 30, and a rear end of a front bar 32 may be coupled to one of the hubs 14.

In some embodiments, each front bar of the pair of opposed front bars 32 defines at least one bend or a curve 34. The at least one bend or curve 34 may provide strength and resilience to the front bar, for example, compared to a straight front bar.

In embodiments, the front frame assembly 28 further includes a pair of upper pivots 35. For example, each front bar of the pair of opposed front bars 32 may include a front segment and a rear segment coupled by a respective upper pivot of the pair of upper pivots 35. The upper pivots may facilitate rotation or movement of the front frame assembly 28, or of the front bars 32, relative to the front hub assembly 30.

In embodiments, the front frame assembly 28 further includes a front expandable crossbar 36 coupled between the pair of opposed front bars 32. The front expandable crossbar 36 may be convertible between a contracted length and an expanded length. The front expandable crossbar 36 may include two or more telescoping members. In some embodiments, the front crossbar 36 extends below and across a portion of the seat frame 20. In some such embodiments, the front crossbar 36 extends below and across a seat base 24 of the seat frame 20. In some such embodiments, the front crossbar 36 extends below and across a portion between the seat base 24 and the leg support 26 of the seat frame 20, for example, below a "knee" portion of the seat frame 20.

In embodiments, the stroller frame 12 includes a rear frame assembly 38. Each rear wheel of the plurality of rear wheels 16 may be coupled to the rear frame assembly 38. In some embodiments, the rear frame assembly 38 is coupled to the pair of laterally opposed hubs 14. For example, the rear frame assembly 38 may extend rearward from the pair of laterally opposed hubs 14.

In embodiments, the rear frame assembly 38 includes a pair of opposed rear bars 40. Each rear wheel of the plurality of rear wheels 16 may be coupled to a respective rear bar of the pair of opposed rear bars 40. In some embodiments, each rear bar of the pair of opposed rear bars 40 is coupled to a respective hub of the pair of laterally opposed hubs 14. For example, an upper end of a rear bar 40 may be coupled to the hubs 14, and a lower end of the rear bar 40 may be coupled to one of the wheels 16.

In embodiments, the rear frame assembly 38 further includes a rear expandable crossbar 42 coupled between the pair of opposed rear bars 40. The rear expandable crossbar 42 may be similar to the front expandable crossbar 36. In some embodiments, the rear expandable crossbar is a first rear expandable crossbar 42, and the rear frame assembly 38 further includes a second rear expandable crossbar 44 coupled between the pair of opposed rear bars 40 and higher than the first rear expandable cross bar 42.

In some embodiments, each rear bar of the pair of opposed rear bars 40 defines a vertical segment 43 and an angled segment 46 extending below the vertical segment 43. The first rear expandable crossbar 42 may be coupled between respective angled segments 46 of the pair of opposed rear bars 40, and wherein the second rear expandable crossbar 44 may be coupled between respective vertical segments 43 of the pair of opposed rear bars 40. In other embodiments, each rear bar of the pair of opposed rear bars 40 may not include an angled segment, and may be straight.

In embodiments, the stroller frame 12 includes an upper frame assembly 48 including a pair of opposed upper bars 50 and an upper expandable crossbar 52 coupled between the pair of opposed upper bars 52. The upper expandable crossbar 52 may be similar to the front expandable crossbar 36. One or more of the front expandable crossbar 36, rear expandable crossbar (42 or 44), or upper expandable crossbar (52) may include respective telescoping segments.

In embodiments, the upper frame assembly 48 is coupled to the pair of laterally opposed hubs 14. For example, each upper bar of the pair of opposed upper bars 50 may be coupled to a respective hub of the pair of laterally opposed hubs 14. The upper bars 50 may be substantially straight, or include a bend or a curve.

In some embodiments, the assembly 10 further includes a seat stabilizing bar 54 coupled between the upper expandable crossbar 52 and the front expandable crossbar 36. In some embodiments, the seat stabilizing bar 54 (or another stabilizing bar) may be coupled to the first rear expandable crossbar 42 or the second rear expandable crossbar 44. In some embodiments, the seat stabilizing bar 54 is fixedly coupled between the upper expandable crossbar 52 and the front expandable crossbar 36 such that the seat stabilizing bar 54 has a same spacing from the seat frame 20 in the single-occupant configuration 10 and the dual-occupant configuration 10a.

One or more of the crossbars 36, 42, 44, or 52 may be lockable in the contracted or expanded configuration to provide lateral rigidity in each configuration, and to resist unintentional conversion. A combination of manual and mechanically-actuated locks may be used. Initially, the manual locks may be released, and then the remaining crossbars may be mechanically-actuated, followed by pulling or pushing to expand or contract the stroller. Finally, the manual locks would be re-locked into the correct position. The mechanically-actuated locks may be spring-loaded for locking automatically. The mechanically-actuated locks may be actuated via cables.

In embodiments, the upper frame assembly 48 includes a pair of handles 56. Each handle 56 may be coupled to a respective upper bar of the pair of opposed upper bars 50. In some embodiments, each handle 56 is rotatably coupled to a respective upper bar of the pair of opposed upper bars 50. For example, the upper frame assembly 48 may include a pair of handle hubs 58 about which handles 56 may be rotatably coupled.

Thus, the stroller assembly 10 may be converted between the single-occupant configuration 10 of FIG. 1 and the dual-occupant configuration 10a of FIGS. 2A and 2B. For example, a user may laterally pull or push the assembly to convert between the configurations.

The front hub assembly 30 may include a pivot assembly, described with reference to FIGS. 3A to 3C and 4.

Figure 3A:
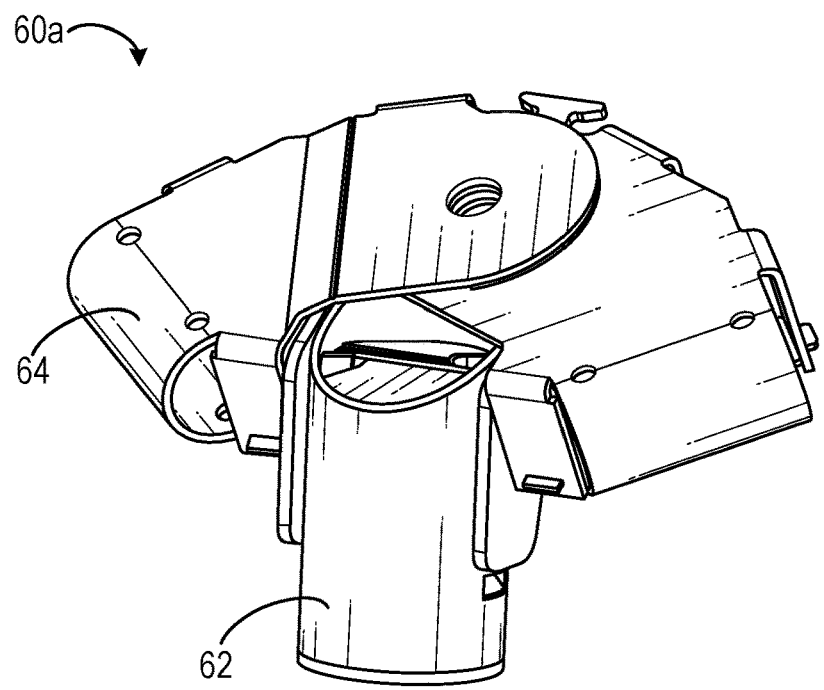
FIG. 3A is a conceptual perspective view of a pivot assembly in a dual-occupant configuration, the pivot assembly coupling the front wheel to the stroller frame of the convertible stroller assembly of FIG. 1.
Figure 3B:
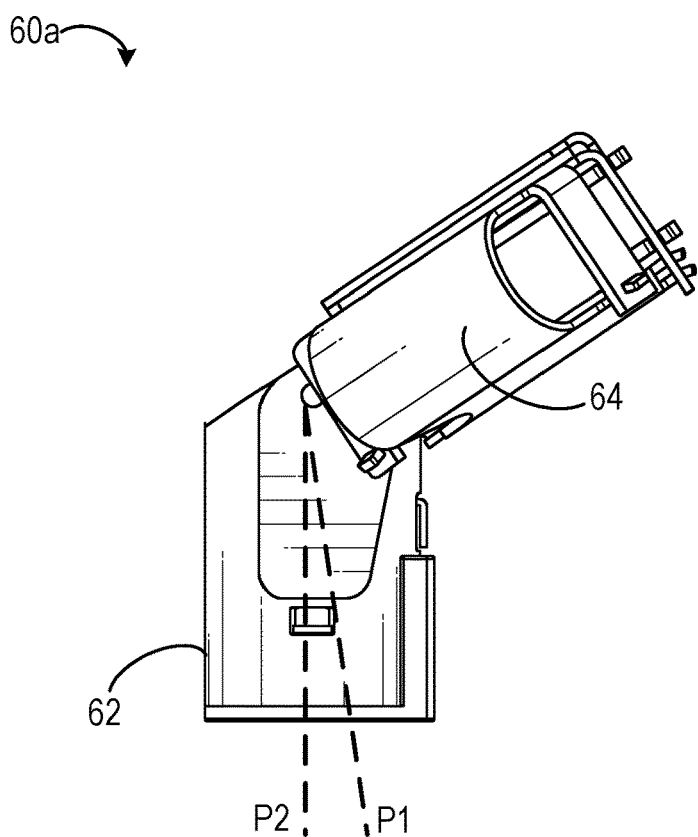
FIG. 3B is a conceptual side view of the pivot assembly of FIG. 3A.
Figure 3C:
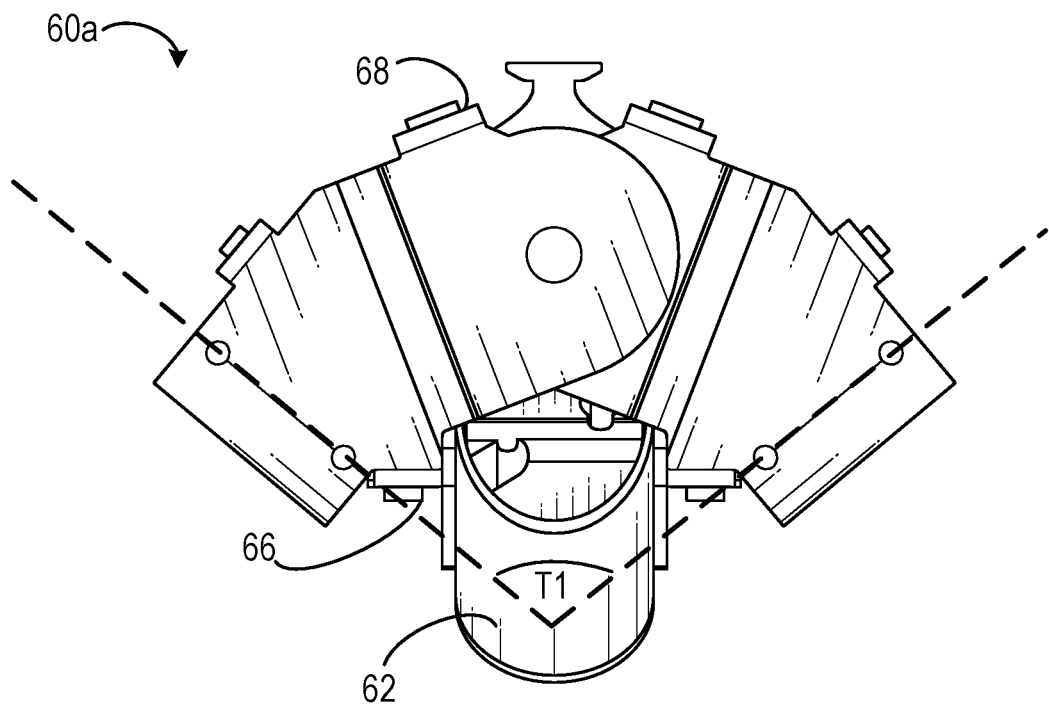
FIG. 3C is a conceptual top view of the pivot assembly of FIG. 3A.

FIG. 3A is a conceptual perspective view of a pivot assembly in a dual-occupant configuration 60a, the pivot assembly 60a coupling the front wheel 18 to the stroller frame 12 of the convertible stroller assembly of FIG. 1. FIG. 3B is a conceptual side view of the pivot assembly 60a of FIG. 3A. FIG. 3C is a conceptual top view of the pivot assembly 60a of FIG. 3A.

The pivot assembly 60a may be made of a material similar to that described with reference to the stroller frame 12. The pivot assembly 60a includes a vertical tube 62 configured to receive the front wheel 18, for example, a leg coupled to the front wheel 18. The pivot assembly 60a further includes a pair of opposed horizontal tubes 64 rotatably coupled to the vertical tube 62. The pair of opposed horizontal tubes 64 may be configured to receive respective front bars of the pair of opposed front bars 32 of the front frame assembly 28.

In embodiments, the pivot assembly 60a includes a pair of inner stops 66 configured to resist a rotation of the pair of opposed horizontal tubes 64 exceeding a dual-occupant inter-tube angle T1, as shown in FIG. 3C. In some embodiments, the pivot assembly 60a includes a pair of outer stops 68 configured to resist a rotation of the pair of opposed horizontal tubes 64 less than a single-occupant inter-tube angle T2. In this way, the pivot assembly 60a may ultimately restrict a relative motion between the front bars 32 received in the pivot assembly 60a, and thus, the expansion and contraction of the front frame assembly 28, to retain expansion and contraction between the inter-wheel distances D1 and D2.

In some embodiments, the vertical tube 62 is tiltable between a single-occupant position P1 and a dual-occupant position P2, as shown in FIG. 3B. The tilt may accommodate a lowering or raising of the front wheel as the assembly 10 is converted. For example, if the tilting is not accommodated, when the size of the front "triangle" formed by the front frame assembly 28 is changed during conversion, the triangle is also elongated, and the entire stroller assembly may tend to rotate backwards by a few degrees (for example, 3 to 4 degrees) resulting in the front leg no longer being vertical. When that happens, the front wheel 18 may resist turning or swiveling as easily as when the leg is vertical, limiting maneuverability. Providing the tiltable vertical tube 62 allows a forward tilting when the front bars 32 are pushed together in single mode.

In some embodiments, the vertical tube 62 is not tiltable, and is retained in a fixed vertical orientation.

Figure 4:
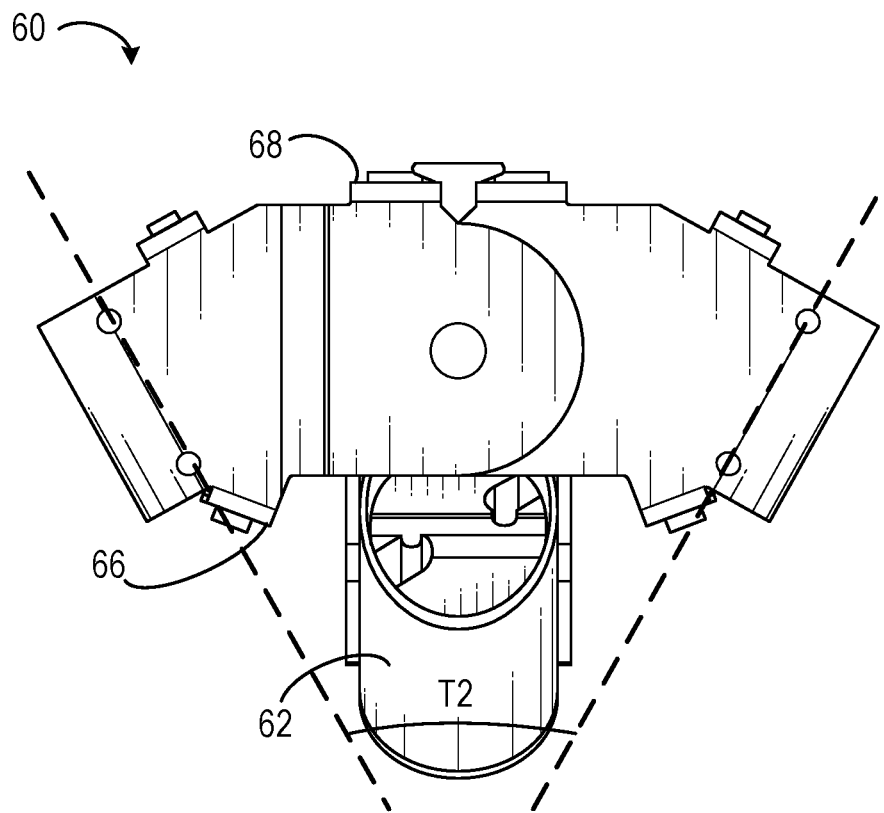
FIG. 4 is a conceptual top view of the pivot assembly of FIG. 3A in the single-occupant configuration.

FIG. 4 is a conceptual top view of the pivot assembly 60a of FIG. 3A in the single-occupant configuration 60. As seen in FIG. 4, the pivot tubes 64 are horizontally rotated to define an inter-tube angle T2 that is smaller than the inter-tube able T1 in FIGS. 3A to 3C, which accommodates the narrowing of the stroller frame 12 and of the front frame assembly 28 during the conversion to a single-occupant configuration.

Figure 5:
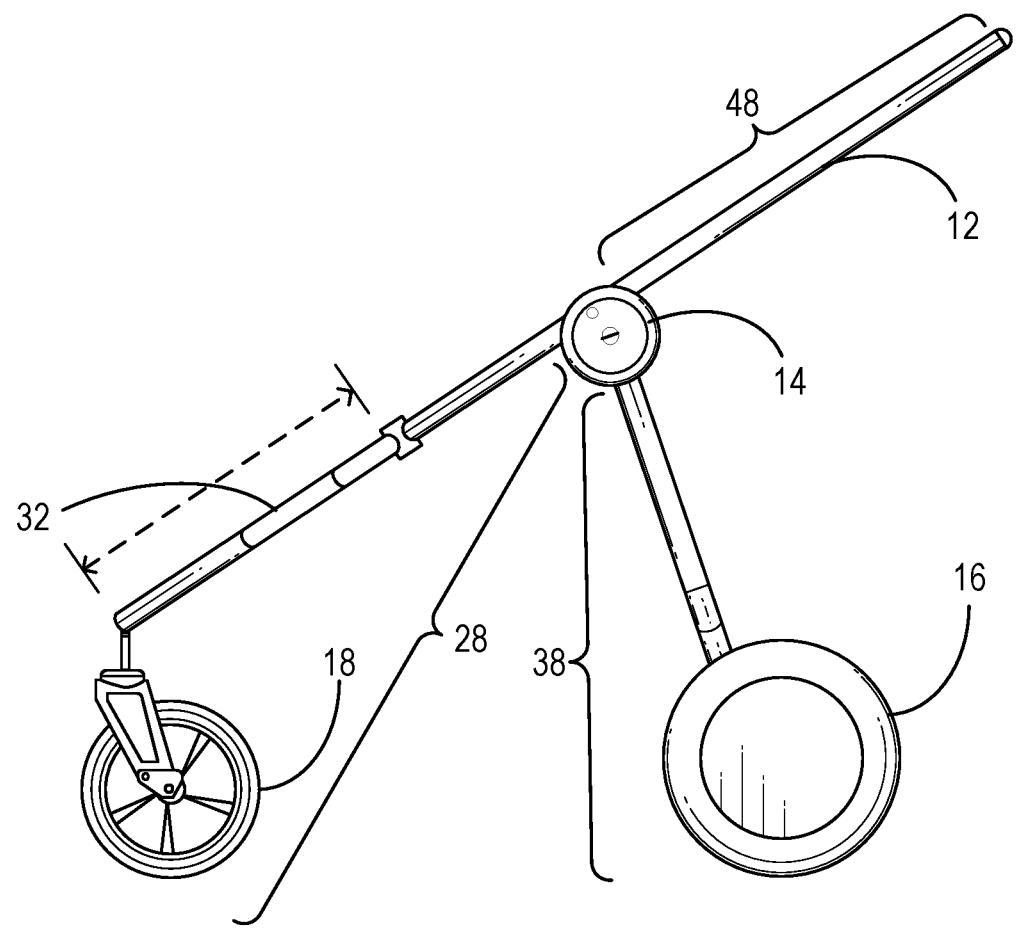
FIG. 5 is a side view showing selected portions of the stroller frame of the stroller assembly of FIG. 1, including an expandable front frame.

FIG. 5 is a side view showing selected portions of the stroller frame of the stroller assembly of FIG. 1, including an expandable front frame assembly 28. In some embodiments, the front bars 32 of the front frame assembly 28 may be expandable, for example, including telescoping members. The expansion of the front bars may accommodate a raising or lowering of the front wheel 18 relative to the stroller frame 12 during conversion of the stroller assembly 10.

Stroller assemblies according to the disclosure may be foldable, for example, in one or both of the single-occupant or double-occupant configurations. In some embodiments, one or more portions of the stroller frame may be folded or rotated relative to a pair of laterally opposed hubs to fold the stroller.

One or more illustrative embodiments of the disclosure have been described above. The above-described embodiments are merely illustrative of the scope of this disclosure and are not intended to be limiting in any way. Accordingly, variations, modifications, and equivalents of the embodiments disclosed herein are also within the scope of this disclosure.

While the present disclosure has been described with reference to a number of embodiments, it will be understood by those skilled in the art that the invention is not limited to such disclosed embodiments. Rather, the invention can be modified to incorporate any number of variations, alterations, substitutions, or equivalent arrangements not described herein, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

Embodiment 1 may include a convertible stroller assembly comprising: a stroller frame being convertible between a laterally contracted configuration and a laterally expanded configuration; a plurality of rear wheels coupled to the stroller frame; and a front wheel coupled to the stroller frame; wherein the convertible stroller assembly is convertible between (i) a single-occupant configuration in which the stroller frame is in the laterally contracted configuration with the rear wheels being separated by a first spacing, and (ii) a dual-occupant configuration in which the stroller frame is in the laterally expanded configuration with the rear wheels being separated by a second spacing greater than the first spacing.

Embodiment 2 may include Embodiment 1, further comprising a seat frame coupled to the stroller frame.

Embodiment 3 may include any one of Embodiments 1 to 2, wherein the seat frame is fixedly coupled to the stroller frame such that a position of the seat frame relative to one side of the stroller frame remains the same in the single-occupant configuration and the dual-occupant configuration.

Embodiment 4 may include any one of Embodiments 1 to 3, wherein the front wheel is laterally centered with respect to the stroller frame in the single-occupant configuration and the dual-occupant configuration.

Embodiment 5 may include any one of Embodiments 1 to 4, wherein the stroller frame comprises a laterally expandable front frame assembly, and wherein the front wheel is coupled to the front frame assembly.

Embodiment 6 may include any one of Embodiments 1 to 5, wherein the stroller frame comprises a pair of laterally opposed hubs, and wherein the front frame assembly is coupled to the pair of laterally opposed hubs.

Embodiment 7 may include any one of Embodiments 1 to 6, wherein the front frame assembly comprises a front hub assembly, and wherein the front wheel is coupled to the front hub assembly.

Embodiment 8 may include any one of Embodiments 1 to 7, wherein the front frame assembly comprises a pair of opposed front bars rotatably coupled to the front hub assembly, and wherein the pair of front bars define a first inter-bar angle at the front hub in the single-occupant configuration and a second inter-bar angle greater than the first inter-bar angle in the dual-occupant configuration.

Embodiment 9 may include any one of Embodiments 1 to 8, wherein each front bar of the pair of opposed front bars is coupled to a respective hub of the pair of laterally opposed hubs.

Embodiment 10 may include any one of Embodiments 1 to 9, wherein each front bar of the pair of opposed front bars defines at least one bend or a curve.

Embodiment 11 may include any one of Embodiments 1 to 10, wherein the front frame assembly further comprises a front expandable crossbar coupled between the pair of opposed front bars.

Embodiment 12 may include any one of Embodiments 1 to 11, wherein the front crossbar extends below and across a portion of the seat frame.

Embodiment 13 may include any one of Embodiments 1 to 12, wherein the front crossbar extends below and across a seat base of the seat frame.

Embodiment 14 may include any one of Embodiments 1 to 13, wherein the stroller frame comprises a rear frame assembly, and wherein each rear wheel of the plurality of rear wheels is coupled to the rear frame assembly.

Embodiment 15 may include any one of Embodiments 1 to 14, wherein the rear frame assembly is coupled to the pair of laterally opposed hubs.

Embodiment 16 may include any one of Embodiments 1 to 15, wherein the rear frame assembly comprises a pair of opposed rear bars, and wherein each rear wheel of the plurality of rear wheels is coupled to a respective rear bar of the pair of opposed rear bars.

Embodiment 17 may include any one of Embodiments 1 to 16, wherein each rear bar of the pair of opposed rear bars is coupled to a respective hub of the pair of laterally opposed hubs.

Embodiment 18 may include any one of Embodiments 1 to 17, wherein the rear frame assembly further comprises a rear expandable crossbar coupled between the pair of opposed rear bars.

Embodiment 19 may include any one of Embodiments 1 to 18, wherein the rear expandable crossbar is a first rear expandable crossbar, and wherein the rear frame assembly further comprises a second rear expandable crossbar coupled between the pair of opposed rear bars and higher than the first rear expandable cross bar.

Embodiment 20 may include any one of Embodiments 1 to 19, wherein each rear bar of the pair of opposed rear bars defines a vertical segment and an angled segment extending below the vertical segment, and wherein the first rear expandable crossbar is coupled between respective angled segments of the pair of opposed rear bars, and wherein the second rear expandable crossbar is coupled between respective vertical segments of the pair of opposed rear bars.

Embodiment 21 may include any one of Embodiments 1 to 20, wherein the stroller frame comprises an upper frame assembly comprising a pair of opposed upper bars and an upper expandable crossbar coupled between the pair of opposed upper bars.

Embodiment 22 may include any one of Embodiments 1 to 21, wherein the upper frame assembly is coupled to the pair of laterally opposed hubs.

Embodiment 23 may include any one of Embodiments 1 to 22, wherein each upper bar of the pair of opposed upper bars is coupled to a respective hub of the pair of laterally opposed hubs.

Embodiment 24 may include any one of Embodiments 1 to 23, further comprising a seat stabilizing bar coupled between the upper expandable crossbar and the front expandable crossbar.

Embodiment 25 may include any one of Embodiments 1 to 24, wherein the seat stabilizing bar is fixedly coupled between the upper expandable crossbar and the front expandable crossbar such that the seat stabilizing bar has a same spacing from the seat frame in the single-occupant configuration and the dual-occupant configuration.

Embodiment 26 may include any one of Embodiments 1 to 25, further comprising a stabilizing bar coupled between the upper expandable crossbar and the rear expandable crossbar.

Embodiment 27 may include any one of Embodiments 1 to 26, wherein the upper frame assembly comprises a pair of handles, wherein each handle is coupled to a respective upper bar of the pair of opposed upper bars.

Embodiment 28 may include any one of Embodiments 1 to 27, wherein each handle is rotatably coupled to a respective upper bar of the pair of opposed upper bars.

Embodiment 29 may include any one of Embodiments 1 to 28, wherein one or more of the front expandable crossbar, rear expandable crossbar, or upper expandable crossbar comprise respective telescoping segments.

Embodiment 30 may include any one of Embodiments 1 to 29, wherein the assembly comprises a single front wheel.

Embodiment 31 may include any one of Embodiments 1 to 30, wherein the front hub assembly comprises a pivot assembly, wherein the pivot assembly comprises: a vertical tube configured to receive a leg coupled to the front wheel; and a pair of opposed horizontal tubes rotatably coupled to the vertical tube, wherein the pair of opposed horizontal tubes is configured to receive respective front bars of the pair of opposed front bars of the front frame assembly.

Embodiment 32 may include any one of Embodiments 1 to 31, wherein the pivot assembly comprises a pair of inner stops configured to resist a rotation of the pair of opposed horizontal tubes exceeding a dual-occupant inter-tube angle.

Embodiment 33 may include any one of Embodiments 1 to 32, wherein the pivot assembly comprises a pair of outer stops configured to resist a rotation of the pair of opposed horizontal tubes less than a single-occupant inter-tube angle.

Embodiment 34 may include any one of Embodiments 1 to 33, wherein the vertical tube is tiltable between a single-occupant position and a dual-occupant position.

What is claimed is:

1. A convertible stroller assembly comprising:
a stroller frame being convertible between a laterally contracted configuration and a laterally expanded configuration;
a plurality of rear wheels coupled to the stroller frame;
a front wheel coupled to the stroller frame; and
a pivot assembly comprising:
a vertical tube configured to receive a leg coupled to the front wheel; and
a pair of opposed horizontal tubes rotatably coupled to the vertical tube;
wherein the convertible stroller assembly is convertible between (i) a single-occupant configuration in which the stroller frame is in the laterally contracted configuration with the rear wheels being separated by a first spacing, and (ii) a dual-occupant configuration in which the stroller frame is in the laterally expanded configuration with the rear wheels being separated by a second spacing greater than the first spacing.

2. The convertible stroller assembly of claim 1, further comprising a seat frame fixedly coupled to the stroller frame such that a position of the seat frame relative to one side of the stroller frame remains the same in the single-occupant configuration and the dual-occupant configuration.

3. The convertible stroller assembly of claim 1, wherein the front wheel is laterally centered with respect to the stroller frame in the single-occupant configuration and the dual-occupant configuration.

4. The convertible stroller assembly of claim 1, wherein the stroller frame comprises a laterally expandable front frame assembly, and wherein the front wheel is coupled to the front frame assembly.

5. The convertible stroller assembly of claim 4, wherein the stroller frame comprises a pair of laterally opposed hubs, and wherein the front frame assembly is coupled to the pair of laterally opposed hubs.

6. The convertible stroller assembly of claim 5, wherein the front frame assembly comprises a pair of opposed front bars rotatably coupled to the front hub assembly, and wherein the pair of front bars define a first inter-bar angle at the front hub in the single-occupant configuration and a second inter-bar angle greater than the first inter-bar angle in the dual-occupant configuration.

7. The convertible stroller assembly of claim 6, wherein the front frame assembly further comprises a front expandable crossbar coupled between the pair of opposed front bars.

8. The convertible stroller assembly of claim 7, wherein the front crossbar extends below and across a seat base of the seat frame.

9. The convertible stroller assembly of claim 1, wherein the stroller frame comprises a rear frame assembly, and wherein each rear wheel of the plurality of rear wheels is coupled to the rear frame assembly.

10. The convertible stroller assembly of claim 9, wherein the rear frame assembly comprises a pair of opposed rear bars, and wherein each rear wheel of the plurality of rear wheels is coupled to a respective rear bar of the pair of opposed rear bars.

11. The convertible stroller assembly of claim 10, wherein the rear frame assembly further comprises a rear expandable crossbar coupled between the pair of opposed rear bars.

12. The convertible stroller assembly of claim 11, further comprising a stabilizing bar coupled between the upper expandable crossbar and the rear expandable crossbar.

13. The convertible stroller assembly of claim 11, wherein the rear expandable crossbar is a first rear expandable crossbar, and wherein the rear frame assembly further comprises a second rear expandable crossbar coupled between the pair of opposed rear bars and higher than the first rear expandable cross bar;
wherein each rear bar of the pair of opposed rear bars defines a vertical segment and an angled segment extending below the vertical segment, and wherein the first rear expandable crossbar is coupled between respective angled segments of the pair of opposed rear bars, and wherein the second rear expandable crossbar is coupled between respective vertical segments of the pair of opposed rear bars.

14. The convertible stroller assembly of claim 1, wherein the stroller frame comprises an upper frame assembly coupled to the pair of laterally opposed hubs, the upper frame assembly comprising a pair of opposed upper bars and an upper expandable crossbar coupled between the pair of opposed upper bars.

15. The convertible stroller assembly of claim 14, further comprising a seat stabilizing bar coupled between the upper expandable crossbar and the front expandable crossbar, wherein the seat stabilizing bar is fixedly coupled between the upper expandable crossbar and the front expandable crossbar such that the seat stabilizing bar has a same spacing from the seat frame in the single-occupant configuration and the dual-occupant configuration.

16. The convertible stroller assembly of claim 15, wherein the upper frame assembly comprises a pair of handles, wherein each handle is coupled to a respective upper bar of the pair of opposed upper bars.

17. The convertible stroller assembly of claim 16, wherein one or more of the front expandable crossbar, rear expandable crossbar, or upper expandable crossbar comprise respective telescoping segments.

18. The convertible stroller assembly of claim 1, wherein the pivot assembly comprises:
a pair of inner stops configured to resist a rotation of the pair of opposed horizontal tubes exceeding a dual-occupant inter-tube angle; and
a pair of outer stops configured to resist a rotation of the pair of opposed horizontal tubes less than a single-occupant inter-tube angle.

19. The convertible stroller assembly of claim 1, wherein the vertical tube is tiltable between a single-occupant position and a dual-occupant position.

* * * * *